(12) United States Patent
Hung (10) Patent No.: US 11,621,637 B2
(45) Date of Patent: Apr. 4, 2023

(54) CONTROL CIRCUIT OF POWER CONVERTER

(71) Applicant: uPI semiconductor corp., Zhubei (TW)

(72) Inventor: Wei-Hsiu Hung, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 45 days.

(21) Appl. No.: 17/460,394

(22) Filed: Aug. 30, 2021

(65) Prior Publication Data

US 2022/0085717 A1 Mar. 17, 2022

(30) Foreign Application Priority Data

Sep. 15, 2020 (CN) .......................... 202010965536.2

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC ............................ H02M 3/158; H02M 1/0009
See application file for complete search history.

(56) References Cited

U.S. PATENT DOCUMENTS

| | | | |
|---|---|---|---|
| 7,605,574 B2 | 10/2009 | Dearn et al. | |
| 8,624,574 B2 | 1/2014 | Chien et al. | |
| 8,698,476 B2 | 4/2014 | Liu | |
| 8,860,483 B2 | 10/2014 | Wang | |
| 8,890,587 B2 | 11/2014 | Stettner | |
| 8,957,660 B2 | 2/2015 | Chen et al. | |
| 9,013,165 B2 | 4/2015 | Kalje et al. | |
| 9,270,176 B1* | 2/2016 | Nguyen | H02M 3/156 |
| 9,831,774 B2 | 11/2017 | Huang | |
| 10,218,274 B1 | 2/2019 | Chan | |
| 2008/0231247 A1* | 9/2008 | Uehara | H02M 3/158 |
| | | | 323/284 |
| 2011/0018516 A1* | 1/2011 | Notman | H02M 3/1588 |
| | | | 323/284 |
| 2011/0031948 A1* | 2/2011 | Chien | H02M 3/1588 |
| | | | 323/282 |
| 2013/0099761 A1* | 4/2013 | Dong | H02M 3/156 |
| | | | 323/288 |

(Continued)

*Primary Examiner* — Rafael O De Leon Domenech (74) *Attorney, Agent, or Firm* — McClure, Qualey & Rodack, LLP (57) ABSTRACT

A control circuit of a power converter includes a sensing circuit, a ramp signal generator, an error amplifier, a comparator and a PWM circuit. The sensing circuit, coupled to a first output circuit, provides a current sensing signal. The ramp signal generator, coupled to the sensing circuit, receives the current sensing signal to provide a ramp signal. The error amplifier receives a reference voltage and an output feedback voltage of the power converter to provide an error amplification signal. The comparator, coupled to the ramp signal generator and the error amplifier, provides a control signal according to the ramp signal and the error amplification signal. The PWM circuit, coupled between the comparator and the first output circuit, receives the control signal and provides a PWM signal to control the first output circuit. The ramp signal generator adjusts a slope of the ramp signal according to the current sensing signal.

7 Claims, 5 Drawing Sheets

(56) References Cited

U.S. PATENT DOCUMENTS

| | | | |
|---|---|---|---|
| 2014/0021928 A1* | 1/2014 | Chen .................... | H02M 3/156 |
| | | | 323/271 |
| 2017/0187278 A1* | 6/2017 | Yamaguchi ........... | H02M 3/158 |
| 2018/0337599 A1* | 11/2018 | Chen .................... | H02M 3/158 |
| 2018/0358898 A1* | 12/2018 | Yamaguchi ............. | G05F 1/461 |

* cited by examiner

CONTROL CIRCUIT OF POWER CONVERTER

BACKGROUND OF THE INVENTION

1. Field of the Invention

The invention relates to a power converter; in particular, to a control circuit of the power converter.

2. Description of the Prior Art

In a conventional power conversion circuit, an output capacitor is coupled in series between an output terminal and a ground terminal. The conventional power conversion circuit uses the capacitance value of the output capacitor and its equivalent series resistor (ESR) for feedback control. When a capacitive component with a small parasitic resistance (such as a ceramic capacitor) is used as the output capacitor, since the feedback control of the power conversion circuit is only affected by the output capacitor, a phase difference between the ripple of the output voltage ripple and the pulse width modulation signal is generated and the stability of the system is affected.

Figure 1:
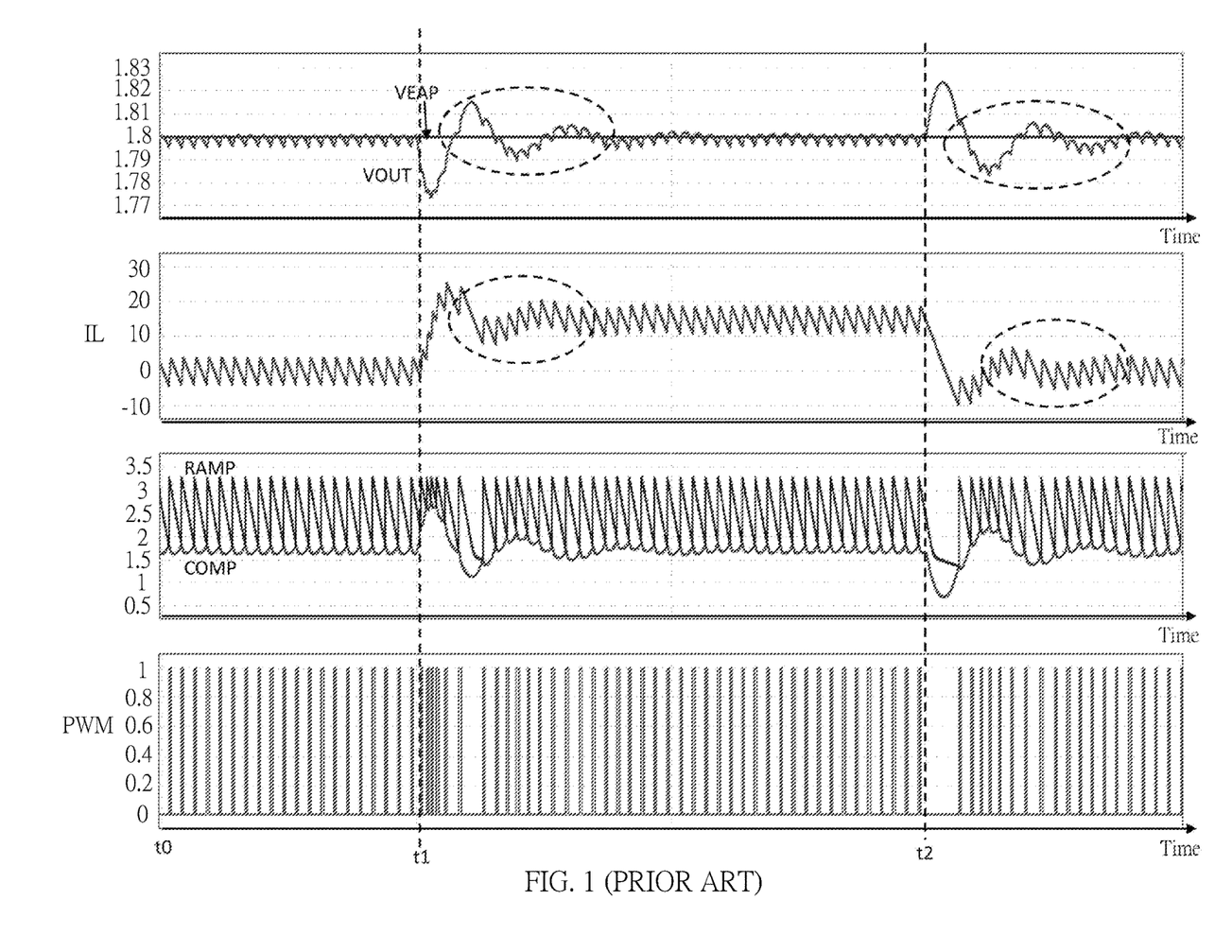
FIG. 1 illustrates a waveform diagram of the transient response of a conventional RCOT power conversion circuit when the output resistance is small.

For example, as shown in FIG. 1, when the equivalent series resistance of the output capacitor (hereinafter referred to as the output resistance) has a small resistance value, after being pumped/unloaded, the ringing phenomenon that the output voltage VOUT of the power conversion circuit fluctuates repeatedly and deviates from a reference voltage VEAP occurs, resulting in unstable inductor current IL of the power conversion circuit and the stability of the system is seriously affected.

SUMMARY OF THE INVENTION

Therefore, the invention provides a control circuit of a power converter to solve the above-mentioned problems in the prior art.

An embodiment of the invention is a control circuit of a power converter. In this embodiment, the control circuit includes a sensing circuit, a ramp signal generator, an error amplifier, a comparator and a pulse width modulation circuit. The sensing circuit is coupled to a first output circuit and configured to provide a current sensing signal. The ramp signal generator is coupled to the sensing circuit and configured to receive the current sensing signal to provide a ramp signal. The error amplifier is configured to receive a reference voltage and an output feedback voltage of the power converter to provide an error amplification signal. The comparator is coupled to the ramp signal generator and the error amplifier and configured to provide a control signal according to the ramp signal and the error amplification signal. The pulse width modulation circuit is coupled between the comparator and the first output circuit and configured to receive the control signal and provide a pulse width modulation signal to control the first output circuit. The ramp signal generator adjusts a slope of the ramp signal according to the current sensing signal.

In one embodiment, the ramp signal generator generates a falling part of the ramp signal according to a default current and the current sensing signal.

In one embodiment, the sensing circuit includes a current mirror. The current mirror is configured to generate a current sensing signal according to the inductor current in the first output circuit, and there is a proportional relationship between the current sensing signal and the inductor current.

In one embodiment, the ramp signal generator includes a capacitor and a current source. One terminal of the capacitor is coupled between the sensing circuit and the comparator and the other terminal of the capacitor is coupled to a ground terminal. One terminal of the current source is coupled between the sensing circuit and the comparator and the other terminal of the current source is coupled to the ground terminal.

In one embodiment, the ramp signal generator further includes a switch and a voltage source. One terminal of the switch is coupled to the capacitor and the current source, and the other terminal of the switch is coupled to the voltage source. The voltage source is coupled between the switch and the ground terminal. The switch is controlled by the control signal to selectively turn on.

In one embodiment, when the current sensing signal is larger, the adjusted slope of the ramp signal is gentler.

In one embodiment, the control circuit is also coupled to a second output circuit. The sensing circuit includes a current mirror. The current mirror is configured to generate the current sensing signal according to a first inductor current in the first output circuit and a second inductor current in the second output circuit, and there is a proportional relationship between the current sensing signal and the first inductor current and the second inductor current.

Compared with the prior art, the control circuit of the power converter in the invention senses an output current (an inductor current) of the power converter and adjusts the falling slope of the ramp signal according to the output current (the inductor current) of the power converter. Therefore, even when the output resistance is small, the control circuit of the power converter of the invention can effectively prevent the output voltage of the power converter from ringing phenomenon after being pumped/unloaded, so that the output current of the power converter is stable, and the output stability of the system can be effectively improved.

The advantage and spirit of the invention may be understood by the following detailed descriptions together with the appended drawings.

DETAILED DESCRIPTION OF THE INVENTION

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment of the invention is a control circuit of a power converter. In this embodiment, the control circuit can be applied to a single-phase power converter or a multi-phase power converter depending on actual requirements.

Figure 2:
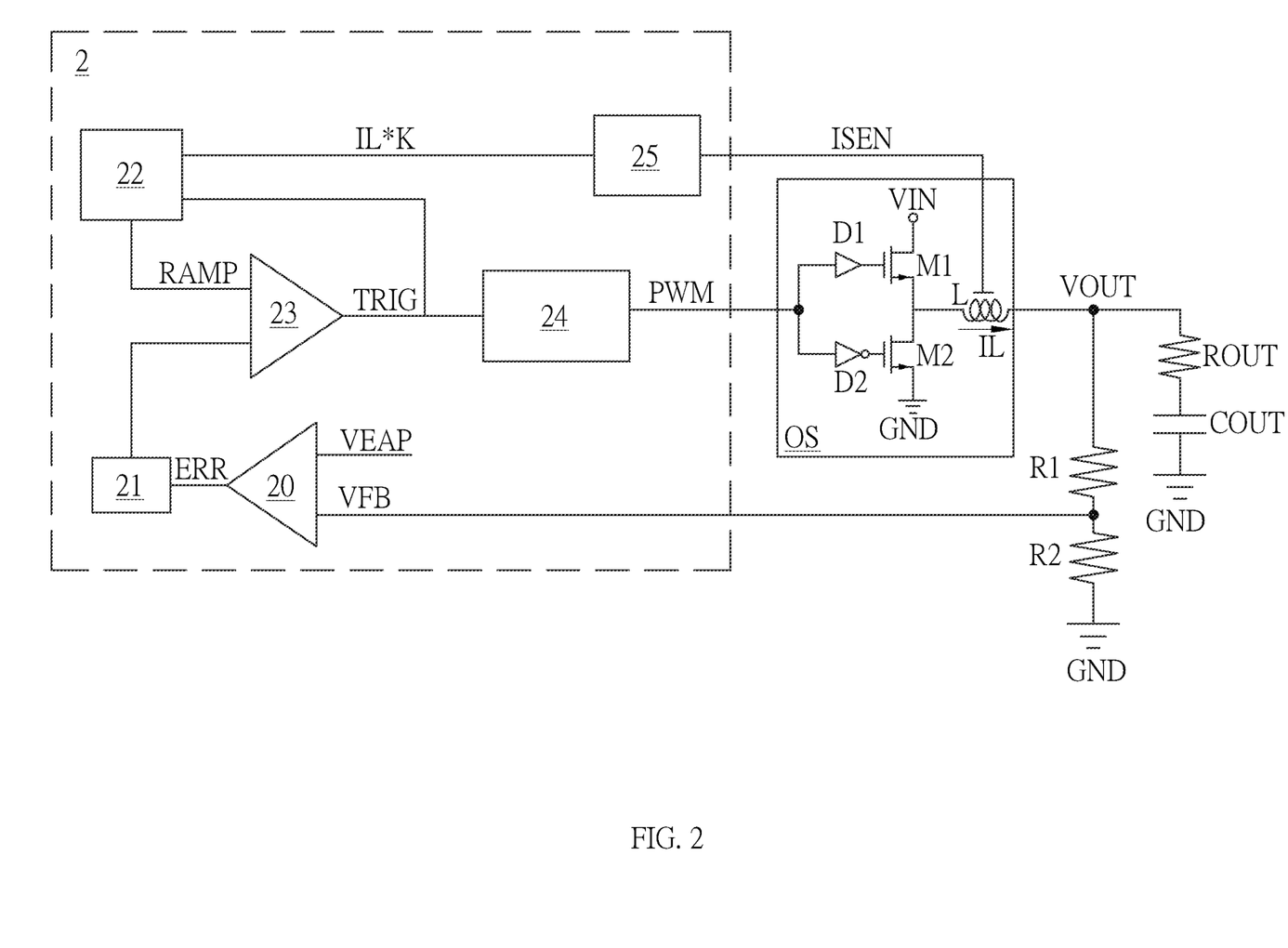
FIG. 2 illustrates a schematic diagram of a control circuit of a power converter in a specific embodiment of the invention.

Please refer to FIG. 2. FIG. 2 illustrates a schematic diagram of the control circuit of the power converter in this embodiment. As shown in FIG. 2, the control circuit 2 is applied to a single-phase power converter having a single output circuit OS. The control circuit 2 is coupled to the output circuit OS. Voltage dividing resistors R1 and R2 are coupled in series between the output circuit OS and a ground terminal GND. An output capacitor COUT and an output resistor ROUT are also coupled in series between the output circuit OS and the ground terminal GND.

The output circuit OS includes drivers D1 and D2, switches M1 and M2 and an output inductor L. The driver D1 is coupled between the control circuit 2 and a control terminal of the switch M1. The driver D2 is coupled between the control circuit 2 and a control terminal of the switch M2. The switches M1 and M2 are coupled in series between an input voltage VIN and the ground terminal GND. One terminal of the output inductor L is coupled between the switches M1 and M2 and the other terminal of the output inductor L is coupled to the output resistor ROUT and the voltage dividing resistor R1.

The control circuit 2 includes an error amplifier 20, a compensation circuit 21, a ramp signal generator 22, a comparator 23, a pulse width modulation circuit 24 and a sensing circuit 25. One input terminal of the error amplifier 20 is coupled between the voltage dividing resistors R1 and R2 and the other input terminal of the error amplifier 20 is coupled to a reference voltage VEAP. An output terminal of the error amplifier 20 is coupled to the compensation circuit 21. The compensation circuit 21 is coupled to one input terminal of the comparator 23. The other input terminal of the comparator 23 is coupled to the ramp signal generator 22. An output terminal of the comparator 23 is coupled to the pulse width modulation circuit 24 and the ramp signal generator 22 respectively. The sensing circuit 25 is coupled between the ramp signal generator 22 and the output circuit OS.

The two input terminals of the error amplifier 20 receive the reference voltage VEAP and an output feedback voltage VFB of the power converter respectively to provide an error amplification signal ERR to the compensation circuit 21. The compensation circuit 21 is coupled to the error amplifier 20 and the comparator 23 and the compensation circuit 21 receives the error amplification signal ERR to provide a compensation signal COMP. The output feedback voltage VFB received by one input terminal of the error amplifier 20 is a voltage between the voltage dividing resistors R1 and R2, that is, a divided voltage of the output voltage VOUT of the power converter, but not limited to this.

The sensing circuit 25 receives a current indicating signal ISEN from the output circuit OS and accordingly provides a current sensing signal IL*K to the ramp signal generator 22. In practical applications, the current indicating signal ISEN is related to the inductor current IL of the output inductor L in the output circuit OS, and there is a proportional relationship between the current sensing signal IL*K and the inductor current IL, for example, the current sensing signal IL*K is K times the inductor current IL, but not limited to this.

When the ramp signal generator 22 receives the current sensing signal IL*K, the ramp signal generator 22 adjusts the ramp signal RAMP transmitted to the comparator 23 according to the current sensing signal IL*K. In practical applications, the ramp signal generator 22 adjusts a slope of the ramp signal RAMP generated by the ramp signal generator 22 according to the current sensing signal IL*K. For example, the ramp signal generator 22 can reduce a slope of a falling part of the ramp signal RAMP according to the current sensing signal IL*K. Therefore, when the current sensing signal IL*K is larger, the slope of the falling part of the ramp signal RAMP is smaller, so that the ramp signal RAMP falls more slowly.

When the two input terminals of the comparator 23 receive the ramp signal RAMP and the compensation signal COMP respectively, the comparator 23 compares the ramp signal RAMP with the compensation signal COMP and generates a control signal TRIG to the pulse width modulation circuit 24 and the ramp signal generator 22 according to the comparison result.

When the pulse width modulation circuit 24 receives the control signal TRIG, the pulse width modulation circuit 24 generates a pulse width modulation signal PWM according to the control signal TRIG and transmits the pulse width modulation signal PWM to the output circuit OS to control the operation of the output circuit OS. In detail, when the drivers D1 and D2 in the output circuit OS receive the pulse width modulation signal PWM, the drivers D1 and D2 control the switches M1 and M2 on or off respectively according to the pulse width modulation signal PWM to form the inductor current IL on the output inductor L and generate the output voltage VOUT.

Figure 3:
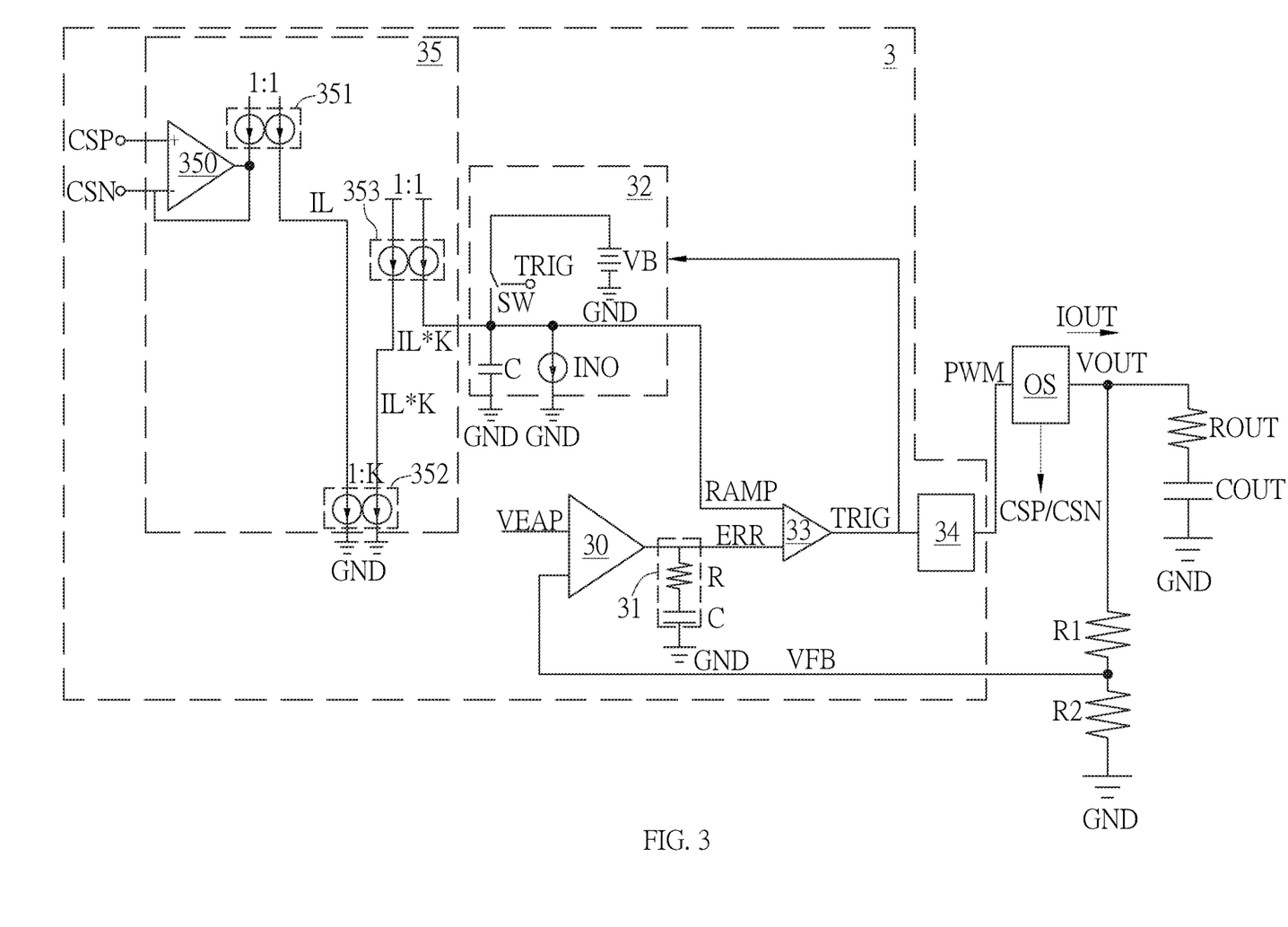
FIG. 3 and FIG. 4 illustrate different embodiments of the control circuit of the invention applied to the single-phase power converter and the two-phase power converter respectively.

Next, please refer to FIG. 3. FIG. 3 illustrates an embodiment of the control circuit of the invention applied to a single-phase power converter.

As shown in FIG. 3, the control circuit 3 is applied to a single-phase power converter having a single output circuit OS. The control circuit 3 is coupled to the output circuit OS. The voltage dividing resistors R1 and R2 are coupled in series between the output circuit OS and a ground terminal GND. An output resistor ROUT and an output capacitor COUT are also coupled in series between the output circuit OS and the ground terminal GND.

The control circuit 3 includes an error amplifier 30, a compensation circuit 31, a ramp signal generator 32, a comparator 33, a pulse width modulation circuit 34 and a sensing circuit 35. One input terminal of the error amplifier 30 is coupled between the voltage dividing resistors R1 and R2 and the other input terminal of the error amplifier 30 is coupled to a reference voltage VEAP. The error amplifier 30 can be a trans-impedance amplifier, and the error signal outputted by the error amplifier 30 is in a form of current. The compensation circuit 31 is coupled to an output terminal of the error amplifier 30 and one input terminal of the comparator 33. The other input terminal of the comparator 33 is coupled to the ramp signal generator 32 and an output terminal of the comparator 33 is coupled to the pulse width modulation circuit 34 and the ramp signal generator 32 respectively. The ramp signal generator 32 is coupled to the sensing circuit 35. The pulse width modulation circuit 34 is coupled to the output circuit OS. The sensing circuit 35 is coupled to the output circuit OS.

The compensation circuit 31 includes a resistor R and a capacitor C. The compensation circuit 31 receives an error output signal ERR of the error amplifier 30, provides zero and pole compensations required for cyclic control, and generates a voltage compensation signal COMP, but not limited to this.

The sensing circuit 35 includes an amplifier 350 and current mirrors 351, 352 and 353. The sensing circuit 35 receives the current indicating signal related to the output current IOUT of the output circuit OS. In this embodiment, the current indicating signal is a set of sensing signals CSP/CSN in a form of voltage. Two input terminals of the amplifier 350 receive the sensing signals CSP/CSN and output the comparison result to control the current mirror 351 with a ratio of 1:1 to generate an inductor current IL to the current mirror 352. Next, the current mirror 352 with a ratio of 1:K generates a current sensing signal IL*K to the current mirror 353 according to the inductor current IL, and the current mirror 353 with a ratio of 1:1 outputs the current sensing signal IL*K to the ramp signal generator 32. In other words, there is a proportional relationship between the current sensing signal IL*K provided by the sensing circuit 35 and the inductor current IL in the output circuit OS, such as 1:K, but not limited to this.

The ramp signal generator 32 includes a voltage source VB, a switch SW, a capacitor C and a current source INO. The voltage source VB is coupled between the switch SW and the ground terminal GND. The capacitor C is coupled between the switch SW and the ground terminal GND. The current source INO is coupled between the switch SW and the ground terminal GND. The sensing circuit 35 is coupled between the switch SW and the capacitor C and between the switch SW and the current source INO. The other input terminal of the comparator 33 is also coupled between the switch SW and the capacitor C and between the switch SW and the current source INO.

When the ramp signal generator 32 receives a control signal TRIG outputted by the comparator 33, the switch SW in the ramp signal generator 32 is briefly turned on in response to a rising edge of the control signal TRIG, thereby pulling the ramp signal RAMP to a vertex voltage VB. When the switch SW is turned off, a default current provided by the current source INO sinks current from the capacitor C, and the current sensing signal IL*K provided by the sensing circuit 35 sources current to the capacitor C, thereby generating a falling part of the ramp signal RAMP to be provided to the other input terminal of the comparator 33.

It should be noted that when the external pumping load increases and the current sensing signal IL*K is larger, the slope of the falling part of the ramp signal RAMP received by the other input terminal of the comparator 33 is smaller, that is, a falling slope of the adjusted ramp signal RAMP is gentler.

Figure 4:
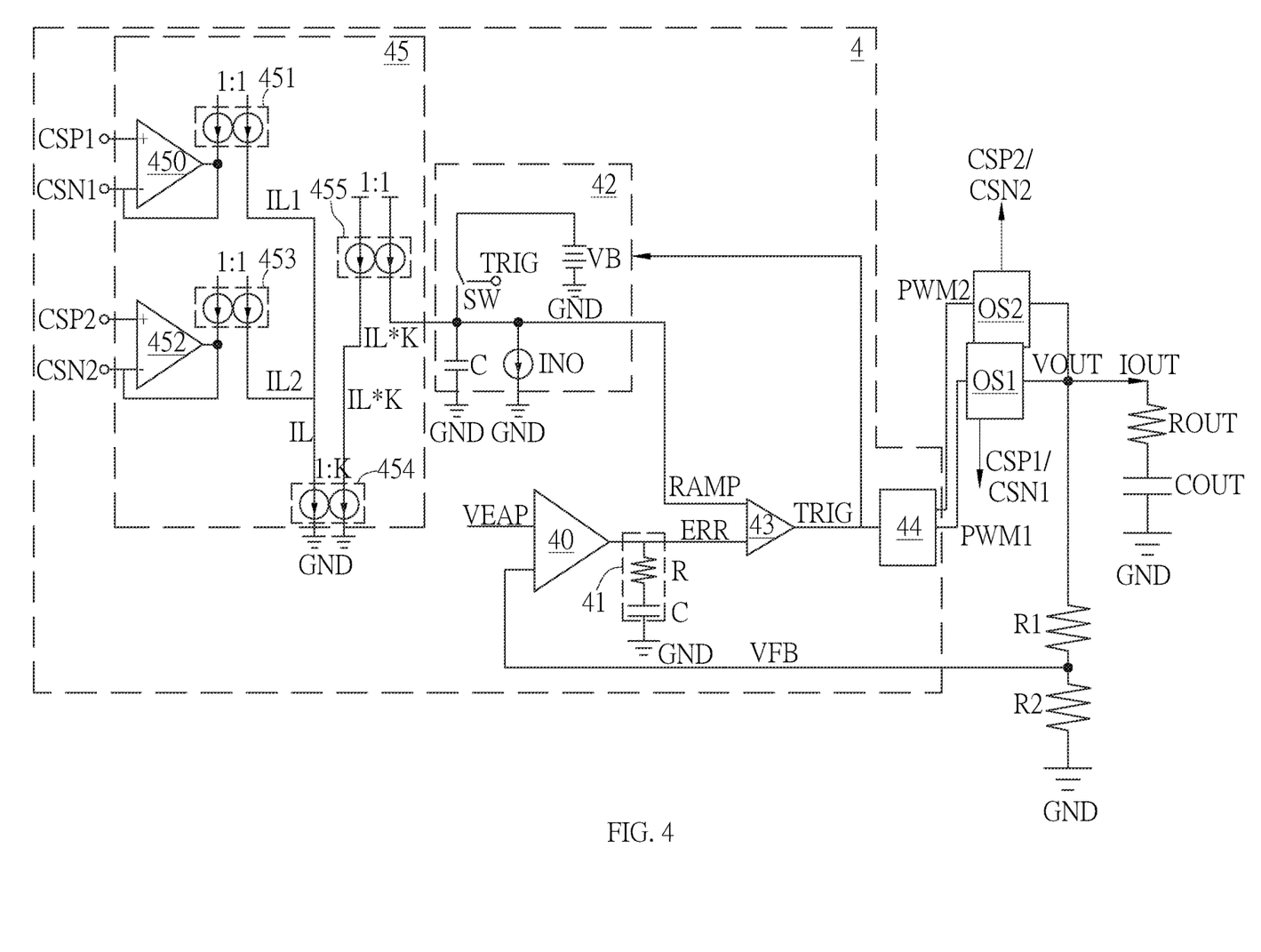

Next, please refer to FIG. 4. FIG. 4 illustrates an embodiment of the control circuit applied to a two-phase power converter of the invention.

As shown in FIG. 4, the control circuit 4 is applied to the two-phase power converter having two output circuits OS1 and OS2 The control circuit 4 is coupled to the output circuits OS1 and OS2 respectively. Voltage divider resistors R1 and R2 are coupled in series between the output circuits OS1 and OS2 and a ground terminal GND. An output resistor ROUT and an output capacitor COUT are also coupled in series between the output circuits OS1 and OS2 and the ground terminal GND.

The control circuit 4 includes an error amplifier 40, a compensation circuit 41, a ramp signal generator 42, a comparator 43, a pulse width modulation circuit 44 and a sensing circuit 45. It is the same as the corresponding components of the control circuit 3 in FIG. 3, and will not be repeated here.

In this embodiment, the pulse width modulation circuit 44 generates pulse width modulation signals PWM1 and PWM2 to the output circuits OS1 and OS2 according to a control signal TRIG to control the operation of the output circuits OS1 and OS2 respectively. The sensing circuit 45 includes amplifiers 450 and 452 and current mirrors 451, 453, 454 and 455.

Two input terminals of the amplifier 450 receive sensing signals CSP1/CSN1 related to the output current of the output circuit OS1 and output the comparison result to control the current mirror 451 with a 1:1 ratio to generate an inductor current IL1 of the output circuit OS1 to the current mirror 454. Similarly, two input terminals of the amplifier 452 receive sensing signals CSP2/CSN2 related to the output current of the output circuit OS2 and output the comparison result to control the current mirror 453 with a ratio of 1:1 to generate an inductor current IL2 of the output circuit OS2 to the current mirror 454.

When the current mirror 454 receives an inductor current IL which is a sum of the inductor current IL1 and the inductor current IL2, the current mirror 454 with a ratio of 1:K generates a current sensing signal IL*K to the current mirror 455 according to the inductor current IL. The current mirror 455 with a ratio of 1:1 outputs the current sensing signal IL*K to the ramp signal generator 42. In other words, there is a proportional relationship between the current sensing signal IL*K provided by the sensing circuit 45 and the total inductor current IL of the multi-phase output circuits OS1 and OS2, such as 1:K, but not limited to this.

In practical applications, the control circuit of the invention can be further applied to multi-phase power converters by analogy, and it is not limited to the above-mentioned single-phase and dual-phase power converters.

Figure 5:
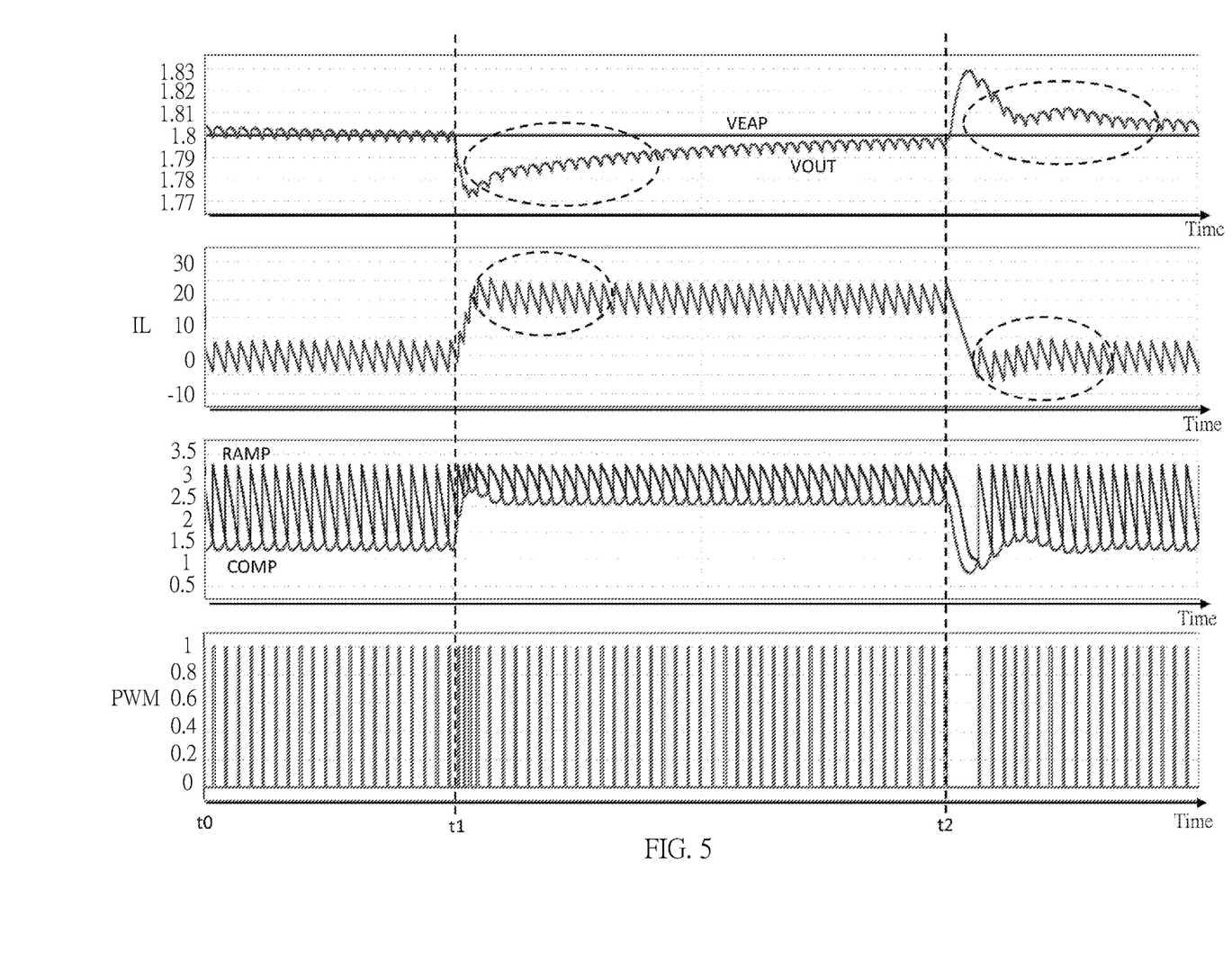
FIG. 5 is a waveform diagram of the transient response of the power converter of the invention when the output resistance is small.

Next, please refer to FIG. 5. FIG. 5 illustrates a waveform diagram of the transient response of the power converter of the invention when the output resistance is small. It is assumed that the output resistance of the power converter of the invention and the conventional power converter in FIG. 1 have the same resistance value and the compensation circuit has the same setup value.

Compared with the output voltage VOUT of the conventional power converter in FIG. 1, the ringing phenomenon that oscillates above and below the reference voltage VEAP occurs multiple times at the start of pumping at the time t1 and after the start of unloading at the time t2, resulting in unstable inductor current IL. In FIG. 5, at the time t1, because the inductor current IL rises with pumping load, the falling slope of the ramp signal RAMP becomes gentler, causing a delay of the time that the compensation signal COMP and the ramp signal RAMP are intersected and a delay of the time that the pulse width modulation signal PWM is generated, so that the output voltage VOUT climbs slower and the compensation signal COMP falls slowly. It is shown that the intersection of the compensation signal COMP and the ramp signal RAMP is moved up in heavy load steady state. In other words, the slope of the ramp signal RAMP becomes gentler according to the inductor current IL at the time t1, so that the compensation signal COMP is increased accordingly, and the compensation signal COMP is maintained at a new higher value. Similarly, at the start of unloading at the time t2, the slope of the ramp signal RAMP returns to the original value, so that the compensation signal COMP decreases back to the original value. Therefore, the output voltage VOUT of the power converter of the invention can rise/decrease slowly after pumping/unloading to approach the ideal reference voltage VEAP, so the above-mentioned ringing phenomenon can be effectively avoided to maintain the stable inductor current IL and improve the output stability of system.

Compared with the prior art, the control circuit of the power converter in the invention senses an output current (an inductor current) of the power converter and adjusts the falling slope of the ramp signal according to the output current (the inductor current) of the power converter. Therefore, even when the output resistance is small, the control circuit of the power converter of the invention can effectively prevent the output voltage of the power converter from ringing phenomenon after being pumped/unloaded, so that the output current of the power converter is stable, and the output stability of the system can be effectively improved.

What is claimed is:

1. A control circuit of a power converter, coupled to a first output circuit, the control circuit comprising:
   a sensing circuit, coupled to the first output circuit and configured to provide a current sensing signal;
   a ramp signal generator, coupled to the sensing circuit and configured to receive the current sensing signal to provide a ramp signal;
   an error amplifier, configured to receive a reference voltage and an output feedback voltage of the power converter to provide an error amplification signal;
   a comparator, coupled to the ramp signal generator and the error amplifier respectively and configured to provide a control signal according to the ramp signal and the error amplification signal; and
   a pulse width modulation circuit, coupled between the comparator and the first output circuit and configured to receive the control signal and provide a pulse width modulation signal to control the first output circuit,
   wherein the ramp signal generator adjusts a slope of the ramp signal according to the current sensing signal, the ramp signal generator further comprises a switch and a voltage source; one terminal of the switch is coupled between the sensing circuit and the comparator, and the other terminal of the switch is coupled to the voltage source; the voltage source is coupled between the switch and a ground terminal, and the switch is controlled by the control signal to be selectively turned on.

2. The control circuit of claim 1, wherein the ramp signal generator generates a falling part of the ramp signal according to a default current and the current sensing signal.

3. The control circuit of claim 1, wherein the sensing circuit comprises a current mirror, and the current mirror is configured to generate the current sensing signal according to an inductor current in the first output circuit, and there is a proportional relationship between the current sensing signal and the inductor current.

4. The control circuit of claim 1, wherein the ramp signal generator comprises a capacitor and a current source; the capacitor is coupled between the switch and the ground terminal; the current source is coupled between the switch and the ground terminal.

5. The control circuit of claim 1, wherein when the current sensing signal is larger, the adjusted slope of the ramp signal is gentler.

6. The control circuit of claim 1, wherein the control circuit is further coupled to a second output circuit, the sensing circuit comprises a current mirror, and the current mirror is configured to generate the current sensing signal according to a first inductor current in the first output circuit and a second inductor current in the second output circuit, and there is a proportional relationship between the current sensing signal and the first inductor current and the second inductor current.

7. A control circuit of a power converter, coupled to a first output circuit, the control circuit comprising:
   a sensing circuit, coupled to the first output circuit and configured to provide a current sensing signal;
   a ramp signal generator, coupled to the sensing circuit and configured to receive the current sensing signal to provide a ramp signal;
   an error amplifier, configured to receive a reference voltage and an output feedback voltage of the power converter to provide an error amplification signal;
   a comparator, coupled to the ramp signal generator and the error amplifier respectively and configured to provide a control signal according to the ramp signal and the error amplification signal; and
   a pulse width modulation circuit, coupled between the comparator and the first output circuit and configured to receive the control signal and provide a pulse width modulation signal to control the first output circuit,
   wherein the ramp signal generator adjusts a slope of the ramp signal according to the current sensing signal, the control circuit is further coupled to a second output circuit, the sensing circuit comprises a current mirror, and the current mirror is configured to generate the current sensing signal according to a first inductor current in the first output circuit and a second inductor current in the second output circuit, and there is a proportional relationship between the current sensing signal and the first inductor current and the second inductor current.

* * * * *